United States Patent Office 3,528,983
Patented Sept. 15, 1970

---

3,528,983
PIPERAZINIUM BIS(ACETYLSALICYLATE)
Edward Henderson, 10 Columbus Circle, Room 1470,
New York, N.Y. 10019
No Drawing. Filed May 4, 1967, Ser. No. 636,025
Int. Cl. C07d 51/64
U.S. Cl. 260—268                                    1 Claim

---

ABSTRACT OF THE DISCLOSURE

Piperazinium bis(acetylsalicylate), useful as an analgesic and anti-pyretic, and the method of making it by admixture of ether solutions of acetylsalicylic acid and piperazine.

---

The present invention relates to piperazinium bis(acetylsalicylate) and to a method of making the same.

Acetylsalicylic acid (aspirin) and its salts are known in the art to have a number of uses, the most important of which is their use as analgesics and anti-pyretics. However, a well-recognized disadvantage of these compounds is their susceptibility to hydrolytic cleavage of the acetyl group in moist air, resulting in the liberation of free acetic and salicylic acids. The latter is highly acidic in comparison with aspirin and the prevention of its formation by decomposition of acetylsalicylic acid or acetylsalicylates is an object much to be desired.

According to the present invention, a salt of acetylsalicylic acid has been found which is exceedingly stable to hydrolysis over a period of years. The salt is piperazinium bis (acetylsalicylate), i.e. piperazinium aspirin or piperazinium 1,4-bis(o-acetoxybenzoate). This material remains stable and unhydrolyzed under conditions in which ordinary aspirin hydrolyzes to a considerable degree. For example, the hydrolysis of aspirin in comparative samples could easily be detected by the odor of acetic acid in the sample bottles: Corresponding samples of the piperazinium salt had no detectable acetic acid odor.

The new salt is a colorless crystalline compound, slightly soluble in water at 25° C. and highly soluble in water at 80° C. The substance, which is a colorless crystalline solid of the formula

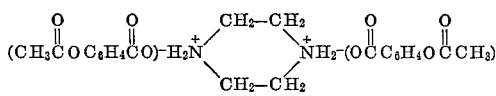

has a melting point of 109–111° C.

The method in which the piperazinium aspirin salt is made affects its resistance to hydrolysis. The exceedingly stable piperazinium salts of most interest are prepared by the neutralization of two molar parts of aspirin, in solution in ethyl ether, with an equivalent quantity, i.e. one molar part, of piperazine dissolved in hot ethyl ether. The use of ether as a medium for the reaction between piperazine and aspirin is unusual, since piperazine is considered to be insoluble in ethyl ether. Indeed, at room temperature this is the case. However, heating to temperatures above room temperature but below the normal boiling point of the ether solubilizes considerable quantities of piperazine, making the above-described process possible. (Still greater quantities of piperazine can be solubilized by operating in pressurized equipment permitting the temperature of the ether to be raised above its normal boiling point.

A better understanding of the present invention and of its many advantages will be had by referring to the following example given by way of illustration:

EXAMPLE 90.1 grams (0.5 mol) of acetylsalicylic acid were dissolved in about 2.5 liters of ethyl ether. A solution of 21.5 grams (0.25 mol) of piperazine in about 1.25 liters of hot ethyl ether was added to the aspirin solution with stirring. A sticky gum formed in a total volume of about 4 liters of ether. The solution was then concentrated to about 300 ml., and the solids therein were removed by filtration and dried. About 110 grams of a crude product having a melting point of about 90°–105° C. were obtained. This product was recrystallized from about 500 ml. of carbon tetrachloride to yield 92 grams (82.5% of theory) of colorless crystals melting at 109°–111° C.

An infrared spectrogram showed the presence of all the expected functional groups.

What is claimed is:

1. Piperazinium bis(acetylsalicylate).

References Cited

UNITED STATES PATENTS

| | | | |
|---|---|---|---|
| 2,753,350 | 7/1956 | Hasselstrom | 260—268 |
| 2,819,268 | 1/1958 | Baisse et al. | 260—268 |
| 2,842,548 | 7/1958 | Callahan | 260—268 |
| 2,980,681 | 4/1961 | Short et al. | 260—268 |
| 3,019,226 | 1/1962 | Bernstein | 260—268 |
| 3,227,718 | 1/1966 | Johannis et al. | 260—268 |
| 3,349,090 | 10/1967 | Broome et al. | 260—268 |

OTHER REFERENCES

Chae et al., Kak Hak Hoeji, vol. 7, pp. 8–12, 1963, abstracted in Chem., Abstr. vol. 62, col. 11810–11 (1963).

German Patent 591,808, 1934, abstracted in Chem. Abstr., vol. 28, col. 2849 (1934).

DONALD G. DAVIS, Primary Examiner

U.S. Cl. X.R.

260—999, 480